(12) United States Patent
Zhang et al.

(10) Patent No.: US 12,014,653 B2
(45) Date of Patent: Jun. 18, 2024

(54) SYSTEM AND METHOD FOR SIMULATING FORMATION AND EVOLUTION OF A DEEP-SEA COLD SEEP ECOSYSTEM

(71) Applicants: GUANGDONG LABORATORY OF SOUTHERN OCEAN SCIENCE AND ENGINEERING (GUANGZHOU), Guangdong (CN); GUANGDONG UNIVERSITY OF TECHNOLOGY, Guangdong (CN)

(72) Inventors: Si Zhang, Guangdong (CN); Jingchun Feng, Guangdong (CN); Zhifeng Yang, Guangdong (CN); Yanpeng Cai, Guangdong (CN)

(73) Assignees: GUANGDONG LABORATORY OF SOUTHERN OCEAN SCIENCE AND ENGINEERING (GUANGZHOU), Guangdong (CN); GUANGDONG UNIVERSITY OF TECHNOLOGY, Guangdong (CN)

( * ) Notice: Subject to any disclaimer, the term of this patent is extended or adjusted under 35 U.S.C. 154(b) by 483 days.

(21) Appl. No.: 17/605,241

(22) PCT Filed: Jan. 27, 2021

(86) PCT No.: PCT/CN2021/073897
§ 371 (c)(1),
(2) Date: Oct. 21, 2021

(87) PCT Pub. No.: WO2021/190120
PCT Pub. Date: Sep. 30, 2021

(65) Prior Publication Data
US 2022/0198962 A1   Jun. 23, 2022

(30) Foreign Application Priority Data
Mar. 26, 2020 (CN) .......................... 202010224754.0

(51) Int. Cl.
*G09B 25/00* (2006.01)
(52) U.S. Cl.
CPC .................................... *G09B 25/00* (2013.01)
(58) Field of Classification Search
CPC ...................................................... G09B 25/00
(Continued)

(56) References Cited

FOREIGN PATENT DOCUMENTS

| CN | 1810376 | 8/2006 |
|----|---------|--------|
| CN | 102352735 | 2/2012 |

(Continued)

OTHER PUBLICATIONS

Translation of CN-106935120-B (Year: 2019).*
"International Search Report (Form PCT/ISA/210) of PCT/CN2021/073897," mailed on Apr. 23, 2021, pp. 1-5.

*Primary Examiner* — Nathaniel T Woodward
(74) *Attorney, Agent, or Firm* — JCIPRNET (57) ABSTRACT

The present invention provides a system and a method for simulating formation and evolution of a deep-sea cold seep ecosystem. Simulation of the cold seep ecosystem is realized and a unit above seabed interface, a seabed interface ecosystem simulation unit, and a subsea interface unit is formed through the system, which provides environmental conditions for evolution of the cold seep ecosystem. At the same, the primary succession and secondary succession of the ecological cold seep system are simulated through the environmental condition control equipment, the sampling cabin, and the seabed current injection system, and the formation environment of the system is remodeled in situ, thereby effectively shortening the period of field observation to research the cold seep ecosystem. The system can not only observe formation and evolution of the cold seep ecosystems, but also grasp key feature points in the development (Continued)

process for the real-time sampling and analysis, which broadens the depth of the cold seep ecosystem research.

18 Claims, 3 Drawing Sheets

(58) Field of Classification Search
USPC .......................................................... 73/53.01
See application file for complete search history.

(56) References Cited

FOREIGN PATENT DOCUMENTS

| | | | | |
|---|---|---|---|---|
| CN | 103540521 | 1/2014 | | |
| CN | 204614346 | 9/2015 | | |
| CN | 108760720 | 11/2018 | | |
| CN | 109211520 | 1/2019 | | |
| CN | 208676143 | 4/2019 | | |
| CN | 106935120 B | * 8/2019 | ............. | G09B 23/24 |
| CN | 110188488 | 8/2019 | | |
| CN | 111477084 | 7/2020 | | |
| CN | 111551390 | 8/2020 | | |
| KR | 101357697 | 2/2014 | | |

* cited by examiner

SYSTEM AND METHOD FOR SIMULATING FORMATION AND EVOLUTION OF A DEEP-SEA COLD SEEP ECOSYSTEM

CROSS-REFERENCE TO RELATED APPLICATION

This application is a 371 of international application of PCT application serial no. PCT/CN2021/073897, filed on Jan. 27, 2021, which claims the priority benefit of China application no. 202010224754.0, filed on Mar. 26, 2020. The entirety of each of the above mentioned patent applications is hereby incorporated by reference herein and made a part of this specification.

TECHNICAL FIELD

The invention relates to the technical field of marine biological resource development, and more specifically, to a system and a method for simulating formation and evolution of a deep-sea cold seep ecosystem.

BACKGROUND

A cold seep is a marine geological phenomenon that fluids below the seabed sedimentary interface, mainly composed of water, hydrocarbons, hydrogen sulfide, and fine-grained sediments, overflow from the seabed by spewing or leaking, and produce a series of physical, chemical and biological effects. At present, more than 900 active cold seeps have been found on the edge of the global continent. The temperature of the cold seep is basically the same as the temperature around the seabed. Because the overflowing fluid is rich in methane, hydrogen sulfide and other components, it can provide rich nutrients to some bacteria and archaea capable of chemoautotrophy and chemosynthesis. It provides carbon sources and energy sources for microorganisms that rely on chemoautotrophy, thereby supplying foundation of food and energy food for the cold seep biota, and multiplying into a unique cold seep ecosystem. Cold seep organisms such as tubular worms can co-exist with chemoautotrophic bacteria. Different cold seep organisms have different dependence on chemoautotrophic bacteria. According to the size of the dependence, the cold seep biome can be divided into non-obligate species (such as brachyuran, gastropods, sea anemones, etc.), potential obligate species (such as limpets, crabs, and gastropods, etc.), obligate species (clams, tubular worms, mussels, and microbial mat, etc.). Cold seep organisms have unique biodiversity and extremely high biodensity, providing unprecedented opportunities for discovering new microbial metabolism pathways, survival strategies and extreme life evolution.

At present, for the investigation and research on the cold seep ecosystem, deep-sea exploration and investigation equipment such as cable-controlled submersibles and remote-controlled submersibles is mainly used. However, due to the diversity of the marine environment, the complexity of the deep-sea environment, and the limitations of detection equipment, current investigation and research on the cold seep ecosystem are limited to limited fragmentary investigation and understanding, and the development of populations and ecosystems of different geographical types varies greatly. There are still many unsolved mysteries in frontier scientific issues such as the community structure, population particularity, niche, food chain, life strategy, the connectivity of habitat patches, and the control factors of ecosystem development in the cold seep ecosystem and so on. To research the control factors and development mechanism of the cold seep ecological environment system, it is urgent to carry out remodeling simulation research on in-situ cold seep ecological environment, and further expand the space and depth of the research on cold seep ecological environment. At present, domestic scholars have successfully cultivated 65 strains of barophilic bacteria using a simple and mobile pressure system. 7 strains of deep-sea barophilic/baroduric bacteria and archaea of genetic operating systems have been constructed, wherein there are 4 strains in China. High-pressure culture systems and omics techniques are used to analyze extreme life metabolism pathways (such as anaerobic methane oxidation by methanotrophic archaea), which provides a scientific foundation for the feasibility of the cold seep in-situ remodeling experiment simulation system. However, there is still a lack of systematic system and method for cultivating cold seep ecology, for cold seep biological cultivation and ecological system research.

SUMMARY

In order to overcome the existing technical defects that there is a lack of systematic system and method for cultivating cold seep ecology, and that remodeling simulation research on in-situ cold seep ecological environment cannot be carried out, and that the space and depth of the cold seep ecological environment research cannot be further expanded, the present invention provides a system and a method for simulating formation and evolution of a deep-sea cold seep ecosystem.

To solve the above technical problems, the technical solution of the present invention is as follows:

A system for simulating formation and evolution of a deep-sea cold seep ecosystem, wherein the system comprises a high-pressure simulation cavity, and geological layers which comprise an unit above seabed interface, a seabed interface ecosystem simulation unit and an unit below seabed interface from bottom to top are constructed in the high-pressure simulation cavity; wherein the unit above seabed interface is used for simulating situation of a seabed water body; the seabed interface ecosystem simulation unit is used for simulating a seabed interface and the deep-sea cold seep ecosystem; the unit below seabed interface is used for simulating a seabed distribution and a development process of a cold seep;

an environmental condition control equipment is provided on the high-pressure simulation cavity for system environmental condition control and data collection;

a sampling cabin is provided on the high-pressure simulation cavity for placement and collection of samples of the deep-sea cold seep ecosystem;

a seabed current injection system is provided on the high-pressure simulation cavity, and the seabed current injection system is used for injecting deep-sea seawater into the seabed interface ecosystem simulation unit to achieve function of ocean current simulation;

control ends of the sampling cabin and the seabed current injection system are electrically connected with the environmental condition control equipment.

A method for simulating formation and evolution of a deep-sea cold seep ecosystem, wherein the method comprises the following steps:

S1: filling and preparing a seabed sediment chemical zoning in a high-pressure simulation cavity according to actual situation to ensure that thickness, distribution and pore parameters of a sediment are consistent or similar to real seabed conditions;

S2: injecting sulfur-containing solution or oxygen saturated solution into different positions of the sediment to form an anaerobic oxidation or hypoxic oxidation state and to complete construction of a seabed sediment chemical zoning simulation layer;

S3: injecting a required amount of seawater into the high-pressure simulation cavity to construct a unit above seabed interface for simulating situation of a seabed water body; and controlling an environmental condition control equipment to ensure that physical and chemical environmental parameters in the high-pressure simulation cavity conform to environmental conditions for development of a cold seep of a real seabed at the same time;

S4: preparing flow composition, fluid volume and injection preparation of a cold seep fluid source system according to actual situation, and preparing pipeline distribution and morphological characteristics of a leakage passageway device, medium filling in pipelines and a flow rate adjusting element of the pipelines, opening or closing the leakage passageway device simultaneously or partially according to needs to simulate development behavior of the cold seep under different leakage modes, and to provide carbon sources and energy sources for the seabed interface ecosystem simulation unit;

S5: adjusting morphology of the sediment of the seabed interface ecosystem simulation unit through a sampling cabin to make it conform to a micro-topography state of the formation and evolution of the cold seep ecosystem; then placing cold seep organisms to cultivate secondary succession of the cold seep ecosystem, or directly carrying out a culture process of primary succession from microorganisms to macroorganisms and the entire cold seep ecosystem after development of the cold seep system without placing organisms, and observing and researching a development process of the cold seep ecosystem;

S6: opening a seabed current injection system according to the actual situation, and keeping resources inside an ocean current in the seabed interface ecosystem simulation unit stable; recording in real time various items of development behavior information and environmental parameter index changes of the cold seep organisms and the ecosystem during the entire development process of the cold seep ecosystem to complete the formation and evolution simulation of the cold seep ecosystem.

In the above-mentioned solution, simulation of the cold seep ecosystem is realized through the system, thus the unit above seabed interface, the seabed interface ecosystem simulation unit, and the subsea interface unit is formed, which provides environmental conditions for evolution of the cold seep ecosystem. And on this basis, primary succession and secondary succession of the ecological cold seep system are simulated through the environmental condition control equipment, the sampling cabin, and the seabed current injection system, and the formation environment of the system is remodeled in situ, thereby effectively shortening the period of field observation to research the cold seep ecosystem.

In the above-mentioned solution, compared with the existing seabed observation and investigation means, it can not only observe formation and evolution of the cold seep ecosystems, but also grasp key feature points in the development process for the real-time sampling and analysis, which broadens the depth of the cold seep ecosystem research. It can not only save the huge cost required for the research on in-situ observation and investigation of the seabed, but also effectively prevent the research plan from being affected by adverse conditions such as the harsh ocean environment and so on.

Compared with the prior art, the beneficial effects of the present invention are as follows:

The present invention provides a system and a method for simulating formation and evolution of a deep-sea cold seep ecosystem. Simulation of the cold seep ecosystem is realized through the system, thus the unit above seabed interface, the seabed interface ecosystem simulation unit, and the subsea interface unit is formed, which provides environmental conditions for evolution of the cold seep ecosystem. And on this basis, primary succession and secondary succession of the ecological cold seep system are simulated through the environmental condition control equipment, the sampling cabin, and the seabed current injection system, and the formation environment of the system is remodeled in situ, thereby effectively shortening the period of field observation to research the cold seep ecosystem. Compared with the existing seabed observation and investigation means, it can not only observe the formation and evolution of the cold seep ecosystems, but also grasp key feature points in the development process for the real-time sampling and analysis, which broadens the depth of the cold seep ecosystem research. It can not only save the huge cost required for the research on in-situ observation and investigation of the seabed, but also effectively prevent the research plan from being affected by adverse conditions such as the harsh ocean environment and so on.

BRIEF DESCRIPTION OF THE DRAWINGS

wherein: 1. high-pressure simulation cavity; 2. unit above seabed interface; 3. seabed interface ecosystem simulation unit; 4. unit below seabed interface; 41. cold seep fluid source system; 411. high-pressure gas source; 412. gas boosting device; 413. gas injection device; 414. liquid injection device; 4141. sulfur-containing solution reservoir; 4142. oxygen saturated solution; 4143. injection pump; 4144. mass flow meter; 4145. controllable valve group; 415. air compressor; 42. leakage passageway device; 421. pipeline; 422. flow rate adjusting element; 423. flow metering element; 43. seabed sediment chemical zoning simulation layer; 431. anaerobic oxidation zone; 432. hypoxic oxidation zone; 433 oxygen-containing oxidation zone; 5. environmental condition control equipment; 51. temperature control device; 52. pressure detection device; 53. gas-liquid circulation device; 54. light source device; 55. metering device; 56. sampling device; 57. processing terminal; 571. data collector; 572. central processing unit; 573. memory; 574. display; 6. sampling cabin; 61. pressure balancing cabin; 62.

pressure controller; 63. on-off valve; 64. movable guide rail; 65. sampler; 7. seabed current injection system.

DETAILED DESCRIPTION

The accompanying drawings are only for exemplary description, and shall not be construed as a limitation to the present invention.

In order to better illustrate the present embodiment, some parts in the accompanying drawings may be omitted, scaled up or scaled down, which do not represent the practical dimensions of the product.

For a person skilled in the art, it is understandable that some commonly known structures may be omitted in accompanying drawings and that their descriptions may be omitted.

The technical solution of the present invention will be further described below in conjunction with the accompanying drawings and embodiments.

Embodiment 1

Figure 1:
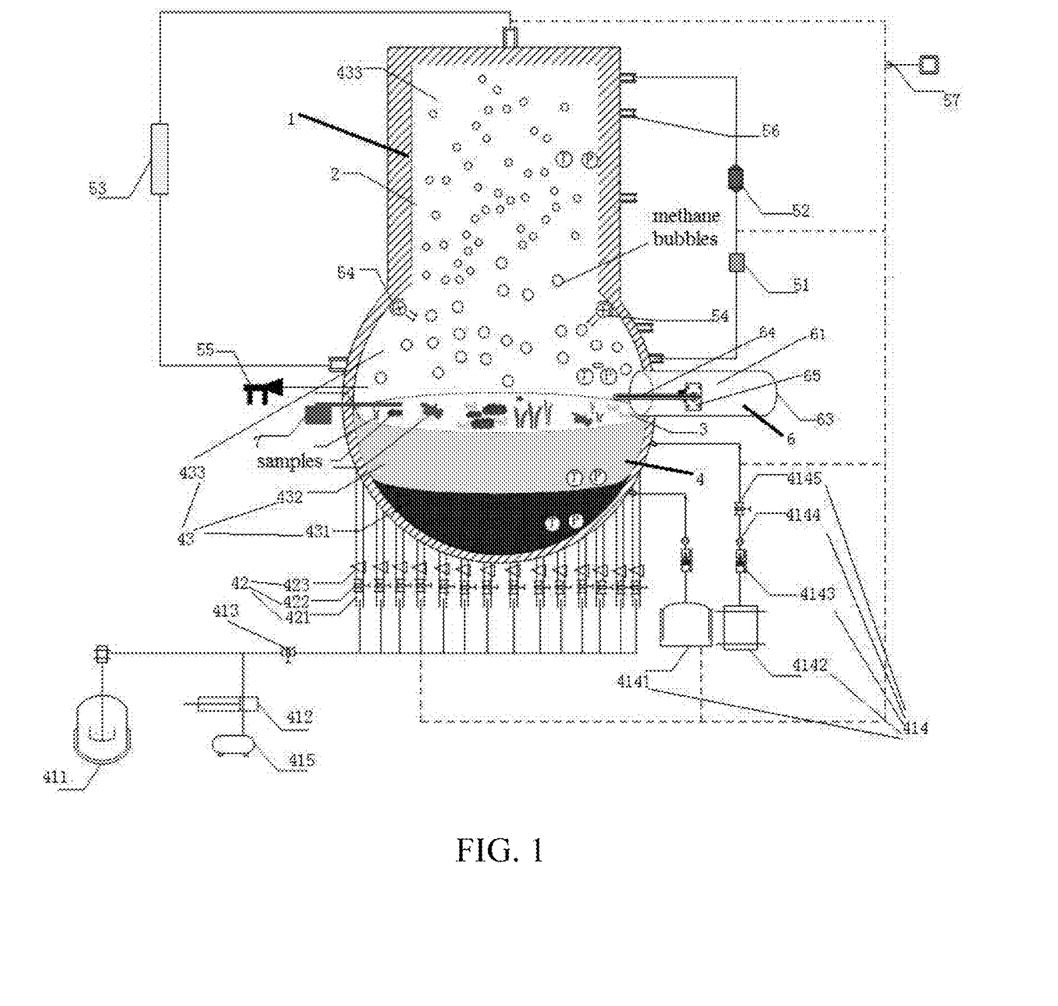
FIG. 1 is a schematic structural view of a system for simulating formation and evolution of a deep-sea cold seep ecosystem.
Figure 2:
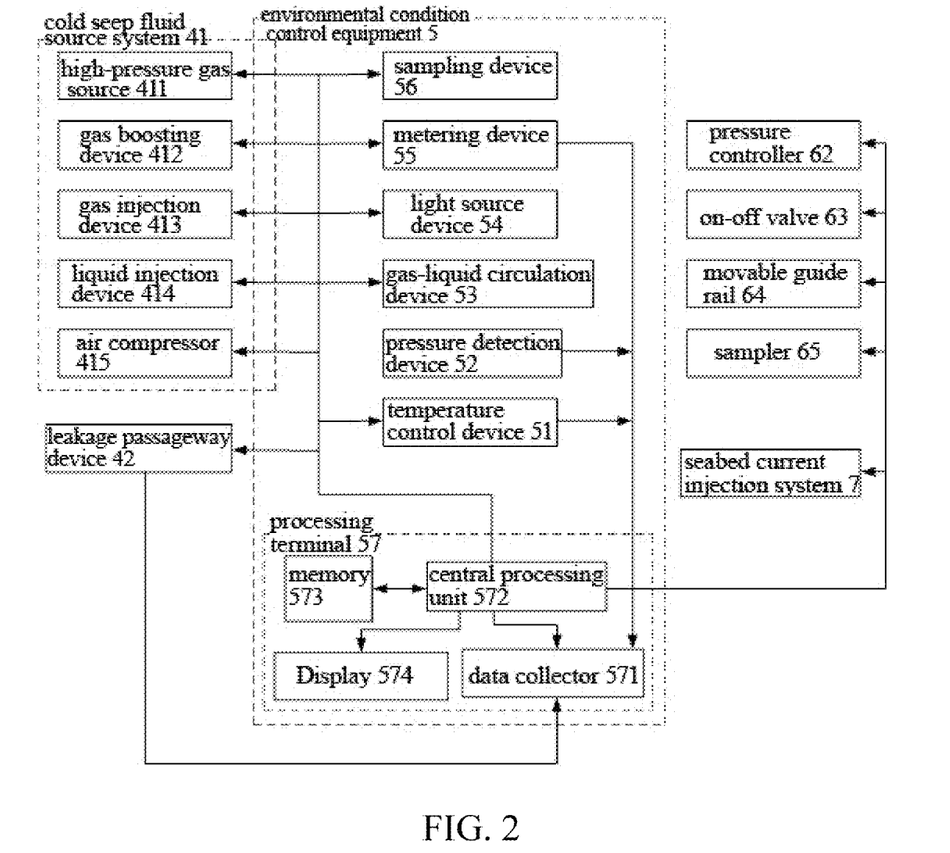
FIG. 2 is a schematic view showing connection of a circuit module of the system for simulating formation and evolution of a deep-sea cold seep ecosystem.

As shown in FIG. 1 and FIG. 2, a system for simulating formation and evolution of a deep-sea cold seep ecosystem comprises a high-pressure simulation cavity 1. Geological layers which comprise an unit above seabed interface 2, a seabed interface ecosystem simulation unit 3 and an unit below seabed interface 4 from bottom to top are constructed in the high-pressure simulation cavity 1. The unit above seabed interface 2 is used for simulating situation of a seabed water body. The seabed interface ecosystem simulation unit 3 is used for simulating a seabed interface and the deep-sea cold seep ecosystem. The unit below seabed interface 4 is used for simulating a seabed distribution and a development process of a cold seep.

An environmental condition control equipment 5 is provided on the high-pressure simulation cavity 1 for system environmental condition control and data collection.

A sampling cabin 6 is provided on the high-pressure simulation cavity 1 for placement and collection of samples of the deep-sea cold seep ecosystem.

A seabed current injection system 7 is provided on the high-pressure simulation cavity 1, and the seabed current injection system 7 is used for injecting deep-sea seawater into the seabed interface ecosystem simulation unit 3 to achieve function of ocean current simulation.

Control ends of the sampling cabin 6 and the seabed current injection system 7 are electrically connected with the environmental condition control equipment 5.

In the specific implementation process, the high-pressure simulation cavity 1 adopts a simulation structure with a combined spherical and column shape. The spherical portion has a diameter of 8 meters and the columnar portion has a height of 15 meters and a diameter of 5 meters, providing enough space with cross-sectional area of 50.24 m$^2$, and marine physical, marine chemical, marine geological and marine biological environmental conditions consistent with or similar to the real seabed environment, for the formation and evolution of the cold seep ecosystem. At the same time, the sampling cabin 6 is used to excavate and sort out, at the seabed interface, the passageway environment which satisfies the development of the cold seep fluid escaping from the interface under the seabed.

In the specific implementation process, simulation of the cold seep ecosystem is realized and a unit above seabed interface 2, a seabed interface ecosystem simulation unit 3, and a subsea interface unit 4 is formed through the system, which provides environmental conditions for evolution of the cold seep ecosystem. And on this basis, primary succession and secondary succession of the ecological cold seep system are simulated through the environmental condition control equipment 5, the sampling cabin 6, and the seabed current injection system 7, and the formation environment of the system is remodeled in situ, thereby effectively shortening the period of field observation to research the cold seep ecosystem.

In the specific implementation process, compared with the existing seabed observation and investigation means, it can not only observe formation and evolution of the cold seep ecosystems, but also grasp key feature points in the development process for the real-time sampling and analysis, which broadens the depth of the cold seep ecosystem research. It can not only save the huge cost required for in-situ observation and research on the seabed, but also effectively prevent the research plan from being affected by adverse conditions such as the harsh ocean environment and so on.

More specifically, the unit below seabed interface 4 comprises a cold seep fluid source system 41, a leakage passageway device 42 and a seabed sediment chemical zoning simulation layer 43, wherein the cold seep fluid source system 41 comprises a high-pressure gas source 411, a gas boosting device 412, a gas injection device 413, and a liquid injection device 414; an output port of the high-pressure gas source 411 is connected through an input port of the gas boosting device 412;

an output port of the gas injection device 413 is connected with an input end of the leakage passageway device 42;

an output end of the leakage passageway device 42 is provided at a bottom of the high-pressure simulation cavity 1;

an output port of the liquid injection device 414 is directly provided at the bottom of the high-pressure simulation cavity 1;

the seabed sediment chemical zoning simulation layer 43 is provided inside the high-pressure simulation cavity 1 to realize chemical zoning simulation of the sediment below the seabed interface;

control ends of the high-pressure gas source 411, the gas boosting device 412, the gas injection device 413, the liquid injection device 414, and the leakage passageway device 42 are all electrically connected with the environmental condition control equipment 5.

In the specific implementation process, an air compressor 415 is provided on the gas boosting device 412.

In the specific implementation process, the cold seep fluid source system 41 mainly provides the high-pressure simulation cavity 1 with leakage sources such as methane gas, methane saturated solution, brine, petroleum, and gas-liquid mixed fluid and so on, according to actual needs. The leakage passageway device 42 is provided with a fluid leakage passageway net, which mainly comprises multiple distributed pipelines 421, according to actual needs. The leakage passageway may be made of transparent or opaque material according to the research needs. And the pipelines 421 are filled with sediment to simulate the situation of the passageway without cracks, or the pipelines 421 simulates the situation of passageway with cracks without being filled with medium. The morphological distribution of pipelines 421 may be in form of vertical distribution, horizontal distribution, inclined distribution or combined distribution according to needs. The seabed sediment chemical zoning simulation layer 43 mainly realizes the chemical zoning simulation in the sediments below the seabed interface, and simulates the natural distribution of an anaerobic oxidation zone 431, a hypoxic oxidation zone 432 and an oxygen-containing oxidation zone 433 from bottom to top in the sediments, providing environment for the anaerobic oxidation and aerobic oxidation in the sedimentary layer after the cold seep fluid leaks and migrates to the sedimentary layer.

In the specific implementation process, the cold seep fluid source system 41 mainly comprises a high-pressure methane storage, a gas boosting pump, and an air compressor. The leakage passageway device 42 is designed to be 14 visualized tubular passageways uniformly and vertically distributed, and a flow rate adjusting element 422 and a flow metering element 423 are designed on the pipelines 421. The material of the pipelines 421 is designed to be pressure-resistant organic glass, and the situation of the leakage passageway with cracks is simulated without filling medium in the pipelines 421.

More specifically, the liquid injection device 414 comprises a sulfur-containing solution reservoir 4141, an oxygen saturated solution 4142, an injection pump 4143, a mass flow meter 4144, and a controllable valve group 4145, wherein
output ends of the sulfur-containing solution reservoir 4141 and the oxygen saturated solution 4142 are all connected to an inside of the high-pressure simulation cavity 1 through the injection pump 4143;
the mass flow meter 4144 and the controllable valve group 4145 are all provided at an output port of the injection pump 4143;
the mass flow meter 4144 and the controllable valve group 4145 are electrically connected with the environmental condition control equipment 5.

More specifically, the leakage passageway device 42 comprises uniformly or non-uniformly distributed pipelines 421, and each of the pipelines 421 is provided with a flow rate adjusting element 422, a flow metering element 423 and a flow observation element; the flow rate adjusting element 422, the flow metering element 423 and the flow observation element are all controlled by the environmental condition control equipment 5.

More specifically, the seabed sediment chemical zoning simulation layer 43 comprises an anaerobic oxidation zone 431, a hypoxic oxidation zone 432 and an oxygen-containing oxidation zone 433 from bottom to top.

In the specific implementation process, a sulfate solution is injected into the anaerobic oxidation zone 431 in the lower layer to simulate a sulfate reduction zone to create the conditions of the anaerobic oxidation zone; the oxygen saturated solution is injected above the anaerobic oxidation zone to create the environment of the hypoxic oxidation zone 432.

More specifically, the environmental condition control equipment 5 comprises a temperature control device 51, a pressure detection device 52, a gas-liquid circulation device 53, a light source device 54, a metering device 55, a sampling device 56 and a processing terminal 57; wherein
control ends of the gas-liquid circulation device 53, the light source device 54, the metering device 55, the sampling device 56 are all electrically connected with the processing terminal 57;
one end port of the gas-liquid circulation device 53 is provided on a top of the high-pressure simulation cavity 1, and another end is provided on an cavity body of the high-pressure simulation cavity 1 to realize circulation of gas-liquid fluid in the unit above seabed interface 2;

the temperature control device 51 comprises several temperature sensors and an annular wall temperature controller, the temperature sensors 511 are uniformly provided in each geological layer in the high-pressure simulation cavity 1, and output ends of the temperature sensors 511 are electrically connected with an input end of the processing terminal 57; the annular wall temperature controller is wraps on an outer wall of the high-pressure simulation cavity 1, and an control end of the annular wall temperature controller is electrically connected with an output end of the processing terminal 57;

the pressure detection device 52 comprises several pressure sensors which are uniformly provided in each geological layer in the high-pressure simulation cavity 1; signal output ends of the pressure sensors are electrically connected with the input end of the processing terminal 57;

the light source device 54 is a net of shadowless light source devices provided at the seabed interface ecosystem simulation unit 3, and provides light source device adjustment for observing development behavior of a cold seep fluid after escaping the seabed interface;

the metering device 55 comprises several acoustic wave detectors which are uniformly provided outside each geological layer in the high-pressure simulation cavity 1 for monitoring leakage rate and leakage flux of a leaking fluid;

the sampling device 56 comprises a sampling port provided at different positions of the unit above seabed interface 2, the seabed interface ecosystem simulation unit 3, and the unit below seabed interface 4 in the high-pressure simulation cavity 1, the sampling device 56 is provided on the sampling port for sample collection;

the processing terminal 57 is electrically connected with the flow rate adjusting element 422, the flow metering element 423 and the flow observation element;

the processing terminal 57 is electrically connected with the control ends of the sampling cabin 6 and the seabed current injection system 7.

In the specific implementation process, the temperature control device 51 and the gas-liquid circulation device 53 circulate the gas-liquid fluid and control the temperature of the gas-liquid fluid in the unit above seabed interface 2, to ensure that the temperature distribution in the high-pressure simulation cavity 1, the temperature distribution of the seabed and the sediment chemical zoning always keep a state similar to the in-situ conditions of the seabed; the gas-liquid circulation device 53 mainly comprises multiple circulating pumps, heat exchanger unit, flow rate control element. At the same time, a water circulation jacket wraps an outside of the high-pressure simulation cavity 1, and the temperature sensors are uniformly distributed and arranged in different layer positions periodically to monitor the temperature changes in the system in real time. The pressure detection device 52 is used to monitor the pressure changes in the system in real time. The processing terminal 57 controls the gas and liquid to be injected into system to keep that the pressure environment in the system, the pressure environment of the seabed and the sediment chemical zoning are in a state similar to the in-situ conditions of the seabed. The processing terminal 57 uses the flow observation element, namely the ultra-high-definition camera system, to shoot and record the development process of the cold seep and the evolution state of bubble and cold seep plumes and the like in the seabed and the water environment above the seabed interface.

In the specific implementation process, due to the large amount of seawater in the high-pressure simulation cavity 1, the seawater temperature cannot be controlled only by the heat exchange of the water circulation jacket. At this time, the circulating pump mounted on the gas-liquid circulation device 53 is used to pump high-temperature seawater from high-pressure simulation cabin cavity 1 and the seawater flows back into the high-pressure simulation cavity 1 after being cooled down by heat exchange in heat exchanger unit, so as to realize the cooling of the seawater in the high-pressure simulation cavity 1. Such a circulation can quickly and uniformly cool the seawater in the high-pressure simulation cabin cavity 1, and when the temperature of the seawater drops to an expected set value, the speed of the seawater flow may be controlled or a flowing pipeline of the gas-liquid circulation device 53 may be closed through the flow rate control element of the gas-liquid circulation device 53.

In the specific implementation process, a thermal insulation layer is provided on the surface of the water circulation jacket of the high-pressure simulation cavity 1. The high-pressure simulation cavity 1 is wrapped in the middle by the two-layer structure to slow down the temperature exchange with the outside, and the water circulation jacket can realize the flowing of the fluid. The water circulation jacket uses a circulating pump to pump out the water inside, and then uses a refrigeration unit to cool the water down. After cooling, the water is pumped back to the water circulation jacket, which is equivalent to the heat exchange between the water circulation jacket and the outer wall of the high-pressure simulation cavity 1. When the heat generated under working condition of each original element in the high-pressure simulation cavity 1 can be taken out by the water circulation jacket, an always stable low temperature environment inside the entire high-pressure simulation cavity 1 is kept, and the deep-sea seawater environment is better simulated.

In the specific implementation process, real-time monitoring of the temperature in the high-pressure simulation cavity 1 is realized by temperature sensors provided at different layer positions, and the flow rate of the fluid in the gas-liquid circulation device 53 and in the water circulation jacket is controlled according to the detection results, so as to achieve stable control of the temperature in simulation cavity 1.

More specifically, a seawater refrigeration unit is further mounted on the gas-liquid circulation device 53.

In the specific implementation process, the temperature control process of the high-pressure simulation cavity 1 specifically comprises a cooling phase, a pressure boosting phase, and a heat preservation phase.

The cooling phase comprises:
1) inject seawater into the high-pressure simulation cavity 1;
2) start the seawater refrigeration unit and adjust the flow rate control element, and pump the high-temperature seawater out from the high-pressure simulation cavity 1 through the circulating pump;
3) the seawater flows back into the high-pressure simulation cavity 1 after the heat exchange unit realizes heat exchange and cooling to realize the cooling of the seawater in the high-pressure simulation cavity 1, and the cooling stage is completed not until the temperature of the seawater in the high-pressure simulation cavity 1 drops to the set value.

The pressure boosting stage:
gas and liquid are injected into the high-pressure simulation cavity 1 to realize the pressure boosting in the high-pressure simulation cavity 1, when the temperature sensor detects that the temperature of the seawater in the high-pressure simulation cavity 1 reaches the set value;
the pressure boosting phase is completed not until the pressure in the high-pressure simulation cavity 1 reaches the set value.

Thermal Insulation Stage:
when the pressure detection device 52 monitors that the pressure in the high-pressure simulation cavity 1 reaches the set value, a thermal insulation layer is laid on the surface of the water circulation jacket;
the refrigeration unit is started, the fluid inside the water circulation jacket is circulated and flows under the action of the circulating pump, and the coil of water circulation jacket and the heat exchanger of pipeline system continuously exchanging away the heat generated by each element in the high-pressure simulation cavity 1 under the working condition, which ensures that the high-pressure simulation cavity 1 is always in the preset temperature environment during the working period and that the temperature distribution in the entire simulation cavity is uniform.

More specifically, the processing terminal 57 comprises a data collector 571, a central processing unit 572, and a memory 573 and a display 574; wherein
an input end of the data collector 571 is electrically connected with output ends of the flow metering element 423, the flow observation element, the temperature control device 51, the pressure detection device 52 and the metering device 55; an output end of the data collector 571 is electrically connected with an input end of the central processing unit 572;
the central processing unit 572 is electrically connected with the memory 573 to realize information interaction;
an output end of the central processing unit 572 is electrically connected with an input end of the display 574 for displaying collected information.

More specifically, the unit above seabed interface 2 mainly simulates a seawater body system of marine environment at the bottom layer at the upper portion of the seabed interface, and the system needs to be filled with seawater that is consistent or similar to the actual marine environment at the bottom layer. The seawater in the present embodiment is the seawater which is artificially modulated with a salinity of about 3.4% according to in-situ investigation data.

Embodiment 2

More specifically, the sampling cabin 6 comprises a pressure balancing cabin 61 mounted on the high-pressure simulation cavity 1. A pressure controller 62, an on-off valve 63 and a movable guide rail 64 are provided in the pressure balancing cabin 61. The movable guide rail 64 is provided with a sampler 65.

The on-off valve 63 is provided at both ends of the pressure balancing cabin 61.

Control ends of the pressure controller 62, the on-off valve 63, the movable guide rail 64 and the sampler 65 are all electrically connected with the environmental condition control equipment 5.

The pressure balancing cabin 61 is provided on the seabed interface simulation unit 3, and the samples are placed on or collected from the seabed interface ecosystem simulation unit 3 by the sampler 7.

In the specific implementation process, the sampler 65 may be a telescopic sampling arm of a guide rail, or a remote-control robot.

More specifically, the sampler 65 comprises a connecting base, a rotating table, a clamping mechanism and a control circuit; wherein:
the sampler 65 is provided on the movable guide rail 64 through the connecting base;
the rotating table is mounted on the connecting base;
the clamping mechanism is mounted on the rotating table;
control ends of the connecting base, the rotating table and the clamping mechanism are all electrically connected with the control circuit;
and the control circuit is electrically connected with the environmental condition control equipment 5.

More specifically, the movable guide rail 64 comprises a guide rail body, a chain pushing device and a driving motor; wherein:
the connecting base is mounted on the guide rail body;
a bottom of the guide rail body is mounted on the chain pushing device;
the chain pushing device is driven by the driving motor;
and a control end of the driving motor is electrically connected with the environmental condition control equipment 5.

In the specific implementation process, the placement and collection of the samples on seabed interface ecosystem simulation unit 3 are realized by operating the pressure controller 62, the on-off valve 63, the movable guide rail 64, and the sampler 65 in the sampling cabin 6.

The Specific Process is as Follows:

When Placing Samples:
ensure that both on-off valves 63 of the pressure balancing cabin 61 are closed, subsequently open the on-off valves 63 communicated with the experimental environment, and place the sample needed to be cultured on the sampler 65, and subsequently close the on-off valve 63 communicated with the experimental environment;
pressure boosting is performed by the pressure controller 62; after the pressure is balanced, the on-off valves 63 communicated with the high-pressure simulation cavity 1 is opened to allow seawater to enter the pressure balancing cabin 61, and the movable guide rail 64 is controlled to move the sampler 65 into the high-pressure simulation cavity 1, and the sample is placed to the designated location;
finally, the sampler 65 is moved back into the pressure balancing cabin 61, and the on-off valves 63 communicated with the high-pressure simulation cavity 1 are closed to complete the placement of the sample.

When Collecting Samples:
ensure that both on-off valves 63 of the pressure balancing cabin 61 are closed, and subsequently open the on-off valves 63 communicated with the high-pressure simulation cavity 1 to allow seawater to enter the pressure balancing cabin 61; after the pressure is balanced, control the movable guide rail 64 to move the sampler 65 into the high-pressure simulation cavity 1, and grab the sample that need to be retrieved;
subsequently, the sampler 65 is moved back into the pressure balancing cabin 61, and the on-off valves 63 communicated with the high-pressure simulation cavity 1 are closed;
the pressure is reduced by the pressure controller 62, and after the pressure is balanced, the on-off valves 63 communicated with the experimental environment are opened, and the sample is taken out into the experimental environment.

In the specific implementation process, during the action of the sampler 65, the connecting base is driven by the control circuit to slide on the movable guide rail to realize horizontal movement of the sampler 65. The rotating table is driven by the control circuit and thus drives the clamping mechanism to perform a 360-degree rotation to realize the multi-angle sampling of the sampler 65. The clamping mechanism is driven by the control circuit to perform clamping or releasing actions, so as to realize the clamping or placing of the sample by sampling.

In the specific implementation process, the sampler 65 may be retracted and moved freely in the pressure balancing cabin 61 and the high-pressure simulation cavity 1, and may move freely in the high-pressure simulation cavity 1. The sampler 65 has a sampling function with 360 degrees of freedom for the samples in the high-pressure simulation cavity 1. At the same time, the sampler 65 may be equipped with lighting equipment to provide a light source for the sampler 65 to enter the high-pressure simulation cavity 1 for sampling, and to provide conditions for the sampler 65 to perform accurate sampling operations.

In the specific implementation process, the chain pushing device is driven by the driving motor to rotate, and the body of the guide rail hinged to the chain pushing device will be pushed out or retracted. Under normal circumstances, the movable guide rail may be completely contained in the pressure balancing cabin 61. When it is needed to place or collect samples, the movable guide rail may be pushed out into the high-pressure simulation cavity 1 to ensure that the sampler 65 can reach all positions on the same horizontal line, which is convenient for placing or collecting samples.

In the specific implementation process, the sampling cabin 6 mainly meets the requirements of placing cold seep organisms obtained in situ on the seabed into the marine environment in the system, taking out the cultivated cold seep organisms from the simulation system for research, and realizing functions such as the mining and sampling of seabed interface sediments, the correction adjustment of seabed micro-landform environment and so on.

Embodiment 3

More specifically, the seabed current injection system 7 comprises several nozzles, a pipeline system, an injection pump group, a regulating valve, and a seawater preparation system; wherein
the nozzles are provided at a seabed interface, and is connected with the seawater preparation system through the pipeline system;
the injection pump group and the regulating valve are both provided on the pipeline system;
the injection pump group, the regulating valve and the seawater preparation system are all electrically connected with the environmental condition control equipment 5;
a controller is provided on the nozzles, and the controller is electrically connected with the environmental condition control equipment 5 for controlling range, spray area and spray direction of the nozzles.

The seawater preparation system comprises a seawater storage tank, a heat exchanger unit, a high-pressure seawater injection pump, a controllable valve group, and a mass flow meter; wherein
- the heat exchanger unit is provided on the seawater storage tank for heat conversion of seawater;
- the seawater storage tank is communicated with the pipeline system through the high-pressure seawater injection pump and the controllable valve group;
- the mass flow meter is provided at an outlet of the controllable valve group;
- the heat exchanger unit, the high-pressure seawater injection pump, the controllable valve group, and the mass flow meter are all electrically connected to the environmental condition control equipment 5.

In the specific implementation process, the seawater preparation system coordinates seawater of different components and different temperatures according to needs, for simulating generation of a currents bottom layer. The prepared seawater flow is injected into the seabed current injection system 7 through the injection pump group, and the flow rate of the seawater is controlled by the regulating valve. Finally, the seawater is ejected into the high-pressure simulation cavity 1 through the pipeline system by the nozzle to achieve the function of ocean current simulation.

In the specific implementation process, the seawater storage tank is used for storing seawater. The heat exchanger unit is used for controlling the temperature of the seawater in the seawater storage tank, and the high-pressure seawater injection pump is used for injecting the seawater into the pipeline system, and the flow is controlled by the controllable valve group. At the same time, the mass flow meter measures the amount of seawater injected, and transmits the measurement results to the environmental condition control equipment.

In the specific implementation process, the seabed current injection system 7 mainly simulates different seabed bottom current environments, remodeling the state of ocean current around the cold seep ecosystem, and provides an ocean current environment for the material circulation and energy flow of the cold seep ecosystem.

Embodiment 4

Figure 3:
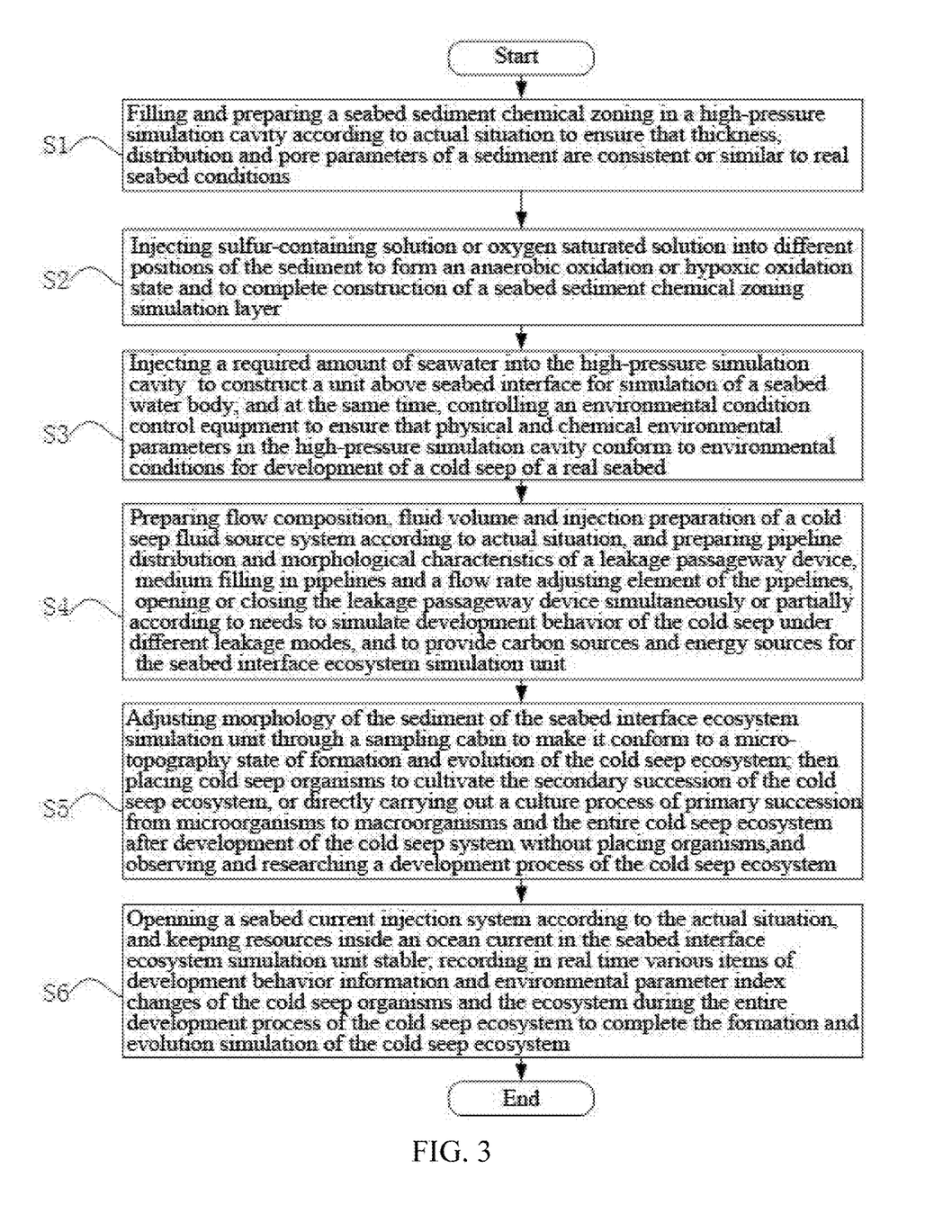
FIG. 3 is a schematic flow diagram showing a method for simulating formation and evolution of the deep-sea cold seep ecosystem.

More specifically, as shown in FIG. 3, a method for simulating formation and evolution of a deep-sea cold seep ecosystem, and the method comprises the following steps:
- S1: filling and preparing a seabed sediment chemical zoning in a high-pressure simulation cavity 1 according to actual situation to ensure that thickness, distribution and pore parameters of a sediment are consistent or similar to real seabed conditions;
- S2: injecting sulfur-containing solution or oxygen saturated solution into different positions of the sediment to form an anaerobic oxidation or hypoxic oxidation state and to complete construction of a seabed sediment chemical zoning simulation layer 43;
- S3: injecting a required amount of seawater into the high-pressure simulation cavity 1 to construct a unit above seabed interface 2 for simulation of a seabed water body; and at the same time, controlling an environmental condition control equipment 5 to ensure that physical and chemical environmental parameters in the high-pressure simulation cavity 1 conform to environmental conditions for development of a cold seep of a real seabed;
- S4: preparing flow composition, fluid volume and injection preparation of a cold seep fluid source system 41 according to actual situation, and preparing pipeline distribution and morphological characteristics of a leakage passageway device 42, medium filling in pipelines 421 and a flow rate adjusting element 422 of the pipelines 421, opening or closing the leakage passageway device 42 simultaneously or partially according to needs to simulate development behavior of the cold seep under different leakage modes, and to provide carbon sources and energy sources for the seabed interface ecosystem simulation unit 3;
- S5: adjusting morphology of the sediment of the seabed interface ecosystem simulation unit 3 through a sampling cabin 6 to make it conform to a micro-topography state of formation and evolution of the cold seep ecosystem; then placing cold seep organisms to cultivate the secondary succession of the cold seep ecosystem, or directly carrying out a culture process of primary succession from microorganisms to macroorganisms and the entire cold seep ecosystem after development of the cold seep system without placing organisms, and observing and researching a development process of the cold seep ecosystem;
- S6: opening a seabed current injection system 7 according to the actual situation, and keeping resources inside an ocean current in the seabed interface ecosystem simulation unit 3 stable; recording in real time various items of development behavior information and environmental parameter index changes of the cold seep organisms and the ecosystem during the entire development process of the cold seep ecosystem to complete the formation and evolution simulation of the cold seep ecosystem.

In the specific implementation process, firstly fill in layers in the high-pressure simulation cavity 1 to prepare the unit above seabed interface 2, the seabed interface ecosystem simulation unit 3, and the unit below seabed interface 4. Fill the high-pressure simulation cavity 1 with pelitic silty seabed sediments having a thickness of 4 meters according to the actual situation. At the same time, the mixed fluid of the sulfate solution, the iron-containing salt solution and the oxygen saturated solution and the like are uniformly injected at the positions of the sedimentary layer at 1.5 meters and 3 meters from the spherical bottom respectively to ensure the redox conditions of different chemical zonings.

Then, the required amount of the overlying marine water body environment of the seabed interface ecosystem simulation unit is injected into the high-pressure simulation cavity 1, and the temperature control device 51, the pressure detection device 52, the seabed current injection system 7 and other auxiliary units are used to ensure that physical and chemical environmental parameters in the high-pressure simulation cavity 1 conform to environmental conditions for the development of formation and evolution of the cold seep ecosystem of the real seabed.

Subsequently, prepare the methane high-pressure gas source and the injection system according to the actual situation. Then, prepare the leakage passage device 42 according to the actual situation. As shown in FIG. 1, the passage system is designed to be vertically distributed, and the pipelines are not filled with medium to simulate the situation of the passageway without cracks. At the same time, the flow rate adjusting of the pipelines and the metering original element are prepared. The leakage passageway device 42 may be opened and closed simultaneously or partially according to needs to simulate development behavior of a cold seep under different leakage modes. After all environmental conditions are in place, turn on the opening system of the cold seep fluid source, and open the leakage passageway system at the same time, and the methane gas will gradually enter in the leakage passage device 42, the sediment chemical zoning layer and the seabed interface layer from the high-pressure gas source, which provides carbon sources and energy sources for formation and evolution of the cold seep ecosystem.

Then, the morphology of the sediment on the seabed interface is adjusted through the sampling cabin 6 to make it conform to the micro-topography state of formation and evolution of the cold seep ecosystem. Place cold seep mussels, tubular worms, *shinkaia crosnieri* and microbial mat obtained by in-situ investigation into the seabed interface through the sample loading and sampling system, carry out the secondary succession culture of the cold seep ecosystem, and observe and research the development process of the cold seep ecosystem. Record in real time various items of development behavior information and environmental parameter index changes of the cold seep organisms and the ecosystem during the entire development process of formation and evolution of the cold seep ecosystem.

Obviously, the above-mentioned embodiments of the present invention are merely examples for clearly illustrating the present invention, rather than limiting the embodiments of the present invention. For those skilled in the art, other different forms of changes or variations can be made based on the above description. There is no need to exhaustively list all implementations. Any modification, equivalent replacement and improvement made within the spirit and principle of the present invention should be included in the protection scope of the claims of the present invention.

What is claimed is:

1. A system for simulating formation and evolution of a deep-sea cold seep ecosystem, comprising a high-pressure simulation cavity, and geological layers which comprise an unit above seabed interface, a seabed interface ecosystem simulation unit and an unit below seabed interface from bottom to top are constructed in the high-pressure simulation cavity; wherein the unit above seabed interface is used for simulating a situation of a seabed water body; the seabed interface ecosystem simulation unit is used for simulating a seabed interface and the deep-sea cold seep ecosystem; the unit below seabed interface is used for simulating a seabed distribution and a development process of a cold seep;
    an environmental condition control equipment is provided on the high-pressure simulation cavity for system environmental condition control and data collection;
    a sampling cabin is provided on the high-pressure simulation cavity for placement and collection of samples of the deep-sea cold seep ecosystem;
    a seabed current injection system is provided on the high-pressure simulation cavity, and the seabed current injection system is used for injecting deep-sea seawater or artificially configuring seawater into the seabed interface ecosystem simulation unit to achieve function of ocean current simulation;
    control ends of the sampling cabin and the seabed current injection system are electrically connected with the environmental condition control equipment.

2. The system for simulating formation and evolution of the deep-sea cold seep ecosystem according to claim 1, wherein the unit below seabed interface comprises a cold seep fluid source system, a leakage passageway device and a seabed sediment chemical zoning simulation layer, wherein the cold seep fluid source system comprises a high-pressure gas source, a gas boosting device, a gas injection device, and a liquid injection device; an output port of the high-pressure gas source is connected through an input port of the gas boosting device;
an output port of the gas injection device is connected with an input end of the leakage passageway device;
an output end of the leakage passageway device is provided at a bottom of the high-pressure simulation cavity;
an output port of the liquid injection device is directly provided at the bottom of the high-pressure simulation cavity;
the seabed sediment chemical zoning simulation layer is provided inside the high-pressure simulation cavity to realize chemical zoning simulation of the sediment below the seabed interface;
control ends of the high-pressure gas source, the gas boosting device, the gas injection device, the liquid injection device, and the leakage passageway device are all electrically connected with the environmental condition control equipment.

3. The system for simulating formation and evolution of the deep-sea cold seep ecosystem according to claim 2, wherein the liquid injection device comprises a sulfur-containing solution reservoir, an oxygen saturated solution, and an injection pump, a mass flow meter and a controllable valve group; wherein
    output ends of the sulfur-containing solution reservoir and the oxygen saturated solution are all connected to an inside of the high-pressure simulation cavity through the injection pump;
    the mass flow meter and the controllable valve group are all provided at an output port of the injection pump;
    the mass flow meter and the controllable valve group are electrically connected with the environmental condition control equipment.

4. The system for simulating formation and evolution of the deep-sea cold seep ecosystem according to claim 3, wherein the sampling cabin comprises a pressure balancing cabin mounted on the high-pressure simulation cavity, a pressure controller, an on-off valve and a movable guide rail are provided in the pressure balancing cabin; the movable guide rail is provided with a sampler;
    the on-off valve is provided at both ends of the pressure balancing cabin;
    control ends of the pressure controller, the on-off valve, the movable guide rail and the sampler are all electrically connected with the environmental condition control equipment;
    the pressure balancing cabin is provided on the seabed interface simulation unit, and the samples are placed on or collected from the seabed interface ecosystem simulation unit by the sampler.

5. The system for simulating formation and evolution of the deep-sea cold seep ecosystem according to claim 2, wherein the leakage passageway device comprises uniformly or non-uniformly distributed pipelines, and each of the pipelines is provided with a flow rate adjusting element, a flow metering element and a flow observation element; the flow rate adjusting element, the flow metering element and the flow observation element are all controlled by the environmental condition control equipment.

6. The system for simulating formation and evolution of the deep-sea cold seep ecosystem according to claim 5, wherein the seabed sediment chemical zoning simulation layer comprises an anaerobic oxidation zone, a hypoxic oxidation zone and an oxygen-containing oxidation zone from bottom to top.

7. The system for simulating formation and evolution of the deep-sea cold seep ecosystem according to claim 5, wherein the environmental condition control equipment comprises a temperature control device, a pressure detection device, a gas-liquid circulation device, a light source device, a metering device, a sampling device and a processing terminal; wherein control ends of the gas-liquid circulation device, the light source device, the metering device, the sampling device are all electrically connected with the processing terminal;

one end port of the gas-liquid circulation device is provided on a top of the high-pressure simulation cavity, and another end is provided on a cavity body of the high-pressure simulation cavity to realize circulation of gas-liquid fluid in the unit above seabed interface;

the temperature control device comprises several temperature sensors and an annular wall temperature controller, the temperature sensors are uniformly provided in each geological layer in the high-pressure simulation cavity, and signal output ends of the temperature sensors are electrically connected with an input end of the processing terminal; the annular wall temperature controller wraps on an outer wall of the high-pressure simulation cavity, and an control end of the annular wall temperature controller is electrically connected with an output end of the processing terminal;

the pressure detection device comprises several pressure sensors which are uniformly provided in each geological layer in the high-pressure simulation cavity; signal output ends of the pressure sensors are electrically connected with the input end of the processing terminal;

the light source device is a net of shadowless light source devices provided at the seabed interface ecosystem simulation unit, and provides light source device adjustment for observing development behavior of a cold seep fluid after escaping the seabed interface;

the metering device comprises several acoustic wave detectors which are uniformly provided outside each geological layer in the high-pressure simulation cavity for monitoring leakage rate and leakage flux of a leaking fluid;

the sampling device comprises a sampling port provided at different positions of the unit above seabed interface, the seabed interface ecosystem simulation unit, and the unit below seabed interface in the high-pressure simulation cavity, the sampling device is provided on the sampling port for sample collection;

the processing terminal is electrically connected with the flow rate adjusting element, the flow metering element and the flow observation element;

the processing terminal is electrically connected with the control ends of the sampling cabin and the seabed current injection system.

8. The system for simulating formation and evolution of the deep-sea cold seep ecosystem according to claim 7, wherein the processing terminal comprises a data collector, a central processing unit, and a memory and a display; wherein an input end of the data collector is electrically connected with output ends of the flow metering element, the flow observation element, the temperature control device, the pressure detection device and the metering device;

an output end of the data collector is electrically connected with an input end of the central processing unit;

the central processing unit is electrically connected with the memory to realize information interaction;

an output end of the central processing unit is electrically connected with an input end of the display for displaying collected information.

9. The system for simulating formation and evolution of the deep-sea cold seep ecosystem according to claim 8, wherein the sampling cabin comprises a pressure balancing cabin mounted on the high-pressure simulation cavity, a pressure controller, an on-off valve and a movable guide rail are provided in the pressure balancing cabin; the movable guide rail is provided with a sampler;

the on-off valve is provided at both ends of the pressure balancing cabin;

control ends of the pressure controller, the on-off valve, the movable guide rail and the sampler are all electrically connected with the environmental condition control equipment;

the pressure balancing cabin is provided on the seabed interface simulation unit, and the samples are placed on or collected from the seabed interface ecosystem simulation unit by the sampler.

10. The system for simulating formation and evolution of the deep-sea cold seep ecosystem according to claim 5, wherein the sampling cabin comprises a pressure balancing cabin mounted on the high-pressure simulation cavity, a pressure controller, an on-off valve and a movable guide rail are provided in the pressure balancing cabin; the movable guide rail is provided with a sampler;

the on-off valve is provided at both ends of the pressure balancing cabin;

control ends of the pressure controller, the on-off valve, the movable guide rail and the sampler are all electrically connected with the environmental condition control equipment;

the pressure balancing cabin is provided on the seabed interface simulation unit, and the samples are placed on or collected from the seabed interface ecosystem simulation unit by the sampler.

11. The system for simulating formation and evolution of the deep-sea cold seep ecosystem according to claim 6, wherein the sampling cabin comprises a pressure balancing cabin mounted on the high-pressure simulation cavity, a pressure controller, an on-off valve and a movable guide rail are provided in the pressure balancing cabin; the movable guide rail is provided with a sampler;

the on-off valve is provided at both ends of the pressure balancing cabin;

control ends of the pressure controller, the on-off valve, the movable guide rail and the sampler are all electrically connected with the environmental condition control equipment;

the pressure balancing cabin is provided on the seabed interface simulation unit, and the samples are placed on or collected from the seabed interface ecosystem simulation unit by the sampler.

12. The system for simulating formation and evolution of the deep-sea cold seep ecosystem according to claim 7, wherein the sampling cabin comprises a pressure balancing cabin mounted on the high-pressure simulation cavity, a pressure controller, an on-off valve and a movable guide rail are provided in the pressure balancing cabin; the movable guide rail is provided with a sampler;

the on-off valve is provided at both ends of the pressure balancing cabin;
control ends of the pressure controller, the on-off valve, the movable guide rail and the sampler are all electrically connected with the environmental condition control equipment;
the pressure balancing cabin is provided on the seabed interface simulation unit, and the samples are placed on or collected from the seabed interface ecosystem simulation unit by the sampler.

13. The system for simulating formation and evolution of the deep-sea cold seep ecosystem according to claim 2, wherein the sampling cabin comprises a pressure balancing cabin mounted on the high-pressure simulation cavity, a pressure controller, an on-off valve and a movable guide rail are provided in the pressure balancing cabin; the movable guide rail is provided with a sampler;
the on-off valve is provided at both ends of the pressure balancing cabin;
control ends of the pressure controller, the on-off valve, the movable guide rail and the sampler are all electrically connected with the environmental condition control equipment;
the pressure balancing cabin is provided on the seabed interface simulation unit, and the samples are placed on or collected from the seabed interface ecosystem simulation unit by the sampler.

14. The system for simulating formation and evolution of the deep-sea cold seep ecosystem according to claim 1, wherein the sampling cabin comprises a pressure balancing cabin mounted on the high-pressure simulation cavity, a pressure controller, an on-off valve and a movable guide rail are provided in the pressure balancing cabin; the movable guide rail is provided with a sampler;
the on-off valve is provided at both ends of the pressure balancing cabin;
control ends of the pressure controller, the on-off valve, the movable guide rail and the sampler are all electrically connected with the environmental condition control equipment;
the pressure balancing cabin is provided on the seabed interface simulation unit, and the samples are placed on or collected from the seabed interface ecosystem simulation unit by the sampler.

15. The system for simulating formation and evolution of the deep-sea cold seep ecosystem according to claim 14, wherein the sampler comprises a connecting base, a rotating table, a clamping mechanism and a control circuit; wherein
the sampler is provided on the movable guide rail through the connecting base;
the rotating table is mounted on the connecting base;
the clamping mechanism is mounted on the rotating table;
control ends of the connecting base, the rotating table and the clamping mechanism are all electrically connected with the control circuit;
the control circuit is electrically connected with the environmental condition control equipment;
wherein the movable guide rail comprises a guide rail body, a chain pushing device and a driving motor; wherein
the connecting base is mounted on the guide rail body;
a bottom of the guide rail body is mounted on the chain pushing device;
the chain pushing device is driven by the driving motor;
a control end of the driving motor is electrically connected with the environmental condition control equipment.

16. The system for simulating formation and evolution of the deep-sea cold seep ecosystem according to claim 14, wherein the seabed current injection system comprises several nozzles, a pipeline system, an injection pump group, a regulating valve, and a seawater preparation system; wherein
the nozzles are provided at a seabed interface, and is connected with the seawater preparation system through the pipeline system;
the injection pump group and the regulating valve are both provided on the pipeline system;
the injection pump group, the regulating valve and the seawater preparation system are all electrically connected with the environmental condition control equipment;
a controller is provided on the nozzles, and the controller is electrically connected with the environmental condition control equipment for controlling range, spray area and spray direction of the nozzles.

17. The system for simulating formation and evolution of the deep-sea cold seep ecosystem according to claim 16, wherein the seawater preparation system comprises a seawater storage tank, a heat exchanger unit, a high-pressure seawater injection pump, a controllable valve group, and a mass flow meter; wherein
the heat exchanger unit is provided on the seawater storage tank for heat conversion of seawater;
the seawater storage tank is communicated with the pipeline system through the high-pressure seawater injection pump and the controllable valve group;
the mass flow meter is provided at an outlet of the controllable valve group;
the heat exchanger unit, the high-pressure seawater injection pump, the controllable valve group, and the mass flow meter are all electrically connected to the environmental condition control equipment.

18. A method for simulating formation and evolution of a deep-sea cold seep ecosystem, the method comprising the following steps:
S1: filling and preparing a seabed sediment chemical zoning in a high-pressure simulation cavity according to an actual situation to ensure that thickness, distribution and pore parameters of a sediment are consistent or similar to real seabed conditions;
S2: injecting sulfur-containing solution or oxygen saturated solution into different positions of the sediment to form an anaerobic oxidation or hypoxic oxidation state and to complete construction of a seabed sediment chemical zoning simulation layer;
S3: injecting a required amount of seawater into the high-pressure simulation cavity to construct a unit above seabed interface for simulating situation of a seabed water body; and controlling an environmental condition control equipment to ensure that physical and chemical environmental parameters in the high-pressure simulation cavity conform to environmental conditions for development of a cold seep of a real seabed at the same time;
S4: preparing flow composition, fluid volume and injection preparation of a cold seep fluid source system according to actual situation, and preparing pipeline distribution and morphological characteristics of a leakage passageway device, medium filling in pipelines and a flow rate adjusting element of the pipelines, opening or closing the leakage passageway device simultaneously or partially according to needs to simulate development behavior of a cold seep under different leakage modes, and to provide carbon sources and energy sources for a seabed interface ecosystem simulation unit;

S5: adjusting morphology of the sediment of the seabed interface ecosystem simulation unit through a sampling cabin to make it conform to a micro-topography state of formation and evolution of the cold seep ecosystem; then placing cold seep organisms to cultivate the secondary succession of the cold seep ecosystem, or directly carrying out a culture process of primary succession from microorganisms to macroorganisms and the entire cold seep ecosystem after development of the cold seep system without placing organisms, and observing and researching a development process of the cold seep ecosystem;

S6: opening a seabed current injection system according to the actual situation, and keeping resources inside an ocean current in the seabed interface ecosystem simulation unit stable; recording in real time various items of development behavior information and environmental parameter index changes of the cold seep organisms and the ecosystem during the entire development process of the cold seep ecosystem to complete the formation and evolution simulation of the cold seep ecosystem.

* * * * *